United States Patent [19]

Mizokami

[11] 4,343,544
[45] Aug. 10, 1982

[54] DIAPHRAGM CONTROL APPARATUS FOR COMBINED USE OF AN ELECTRONIC FLASH WITH A CAMERA

[75] Inventor: Kazunori Mizokami, Hachioji, Japan

[73] Assignee: Olympus Optical Company Ltd., Tokyo, Japan

[21] Appl. No.: 166,078

[22] Filed: Jul. 7, 1980

[30] Foreign Application Priority Data

Aug. 22, 1979 [JP] Japan .................................. 54-106932

[51] Int. Cl.³ ....................... G03B 15/05; G03B 17/18
[52] U.S. Cl. ..................................... 354/149; 354/139; 354/271
[58] Field of Search ............... 354/149, 139, 141, 271, 354/40, 41, 42, 43, 44

[56] References Cited

U.S. PATENT DOCUMENTS 4,122,463 10/1978 Tanaka ............................ 354/149 X
4,285,586 8/1981 Kawasaki et al. ............... 354/139 X

FOREIGN PATENT DOCUMENTS 51-49025 4/1976 Japan .
51-37631 5/1976 Japan .
52-94128 8/1977 Japan .

*Primary Examiner*—L. T. Hix
*Assistant Examiner*—S. D. Schreyer
*Attorney, Agent, or Firm*—Weinstein & Sutton

[57] ABSTRACT

A diaphragm control apparatus for combined use of an electronic flash with a camera includes a changeover switch which assumes different positions depending whether a flash photography utilizing a usual electronic flash, a flash photography utilizing a devoted electronic flash or normal photography is involved. The apparatus operates to produce a signal indicative of the use of a devoted electronic flash which predominates whenever the devoted electronic flash is mounted on the camera if the changeover switch assumes its position indicative of the use of a usual electronic flash, thus automatically establishing a diaphragm value in a camera which is associated with the devoted electronic flash.

4 Claims, 5 Drawing Figures

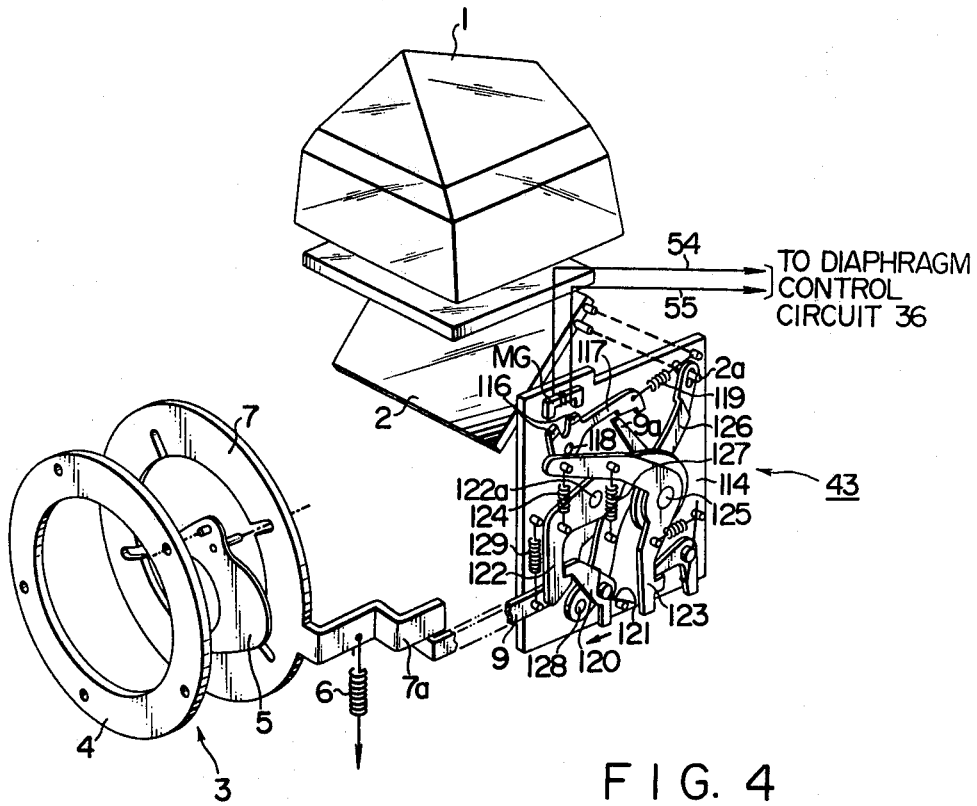
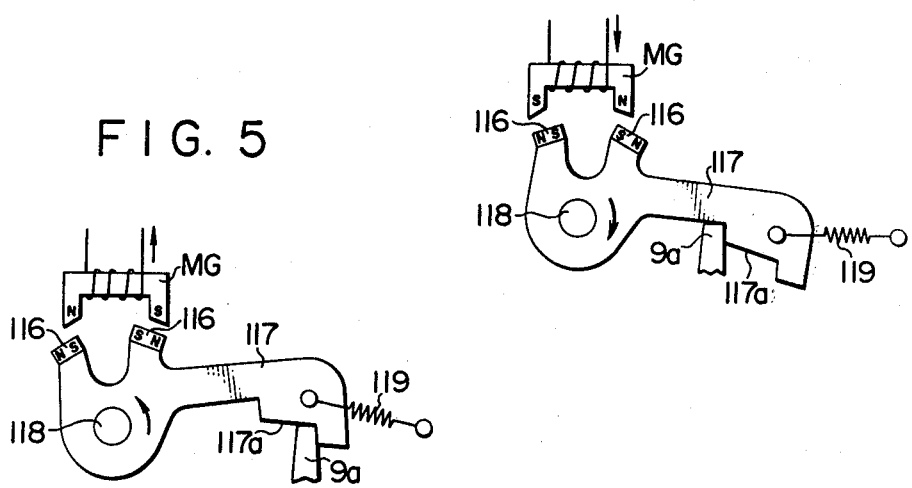

DIAPHRAGM CONTROL APPARATUS FOR COMBINED USE OF AN ELECTRONIC FLASH WITH A CAMERA

BACKGROUND OF THE INVENTION

The invention relates to a diaphragm control apparatus for combined use of an electronic flash with a camera, and more particularly, to a diaphragm control apparatus which is uniquely designed for use with a devoted electronic flash.

A photographic camera of the automatic exposure type, such as a programmed EE camera, having the capability to control a diaphragm value automatically in accordance with an output from a photometric circuit is known. When the camera is provided with a manual diaphragm presetting mechanism and is adapted to enable a flash photography utilizing a devoted or a usual electronic flash, a changeover switch may be provided to switch between a normal automatic exposure and a flash photography utilizing a usual electronic flash. Whenever a flash photography is desired utilizing a usual electronic flash, the changeover switch is thrown to a corresponding position. In this instance, a diaphragm value such as F4, F8, for example, is preset in a camera by operating the manual diaphragm mechanism in accordance with a proper diaphragm value or guide number instructed for use with a usual electronic flash. The changeover switch is thrown to a normal position for taking pictures in a normal automatic exposure mode or by a flash photography utilizing a devoted electronic flash. During a normal automatic exposure mode, a proper diaphragm value is automatically established in response to an output from a photometric circuit, and during a flash photography utilizing a devoted electronic flash, a proper diaphragm value associated with the devoted electronic flash is also automatically established.

However, with a camera of the type described, if a flash photography is attempted utilizing the devoted electronic flash while maintaining the changeover switch thrown to the usual electronic flash position, there results a difficulty that a diaphragm value corresponding to the devoted electronic flash is not established in the camera since a signal from the switch predominates.

SUMMARY OF THE INVENTION

It is an object of the invention to eliminate the described difficulty of the prior art by providing a diaphragm control apparatus for combined use of an electronic flash with a camera in which a diaphragm presetting circuit is predominantly responsive to a signal from a circuit which detects the mounting of a devoted electronic flash to thereby allow a proper diaphragm value to be automatically established by a diaphragm assembly of the camera whenever the devoted electronic flash is mounted on the camera even if the changeover switch is left thrown to its usual electronic flash position.

According to the invention, even if the changeover switch of the camera is left thrown to its usual electronic flash position, a diaphragm value associated with the devoted electronic flash is automatically and predominantly established in the camera whenever the devoted electronic flash is mounted on the camera. In this manner, it is assured that a flash photography utilizing the devoted electronic flash can be performed with the proper diaphragm value.

BRIEF DESCRIPTION OF THE DRAWINGS

FIG. 3 is a perspective view of a diaphragm control mechanism which is controlled by the electrical circuit shown in FIG. 2; and FIGS. 4 and 5 are illustrations of the operation of a diaphragm control electromagnet and a cam plate both shown in FIG. 3.

DESCRIPTION OF PREFERRED EMBODIMENT

Figure 1:
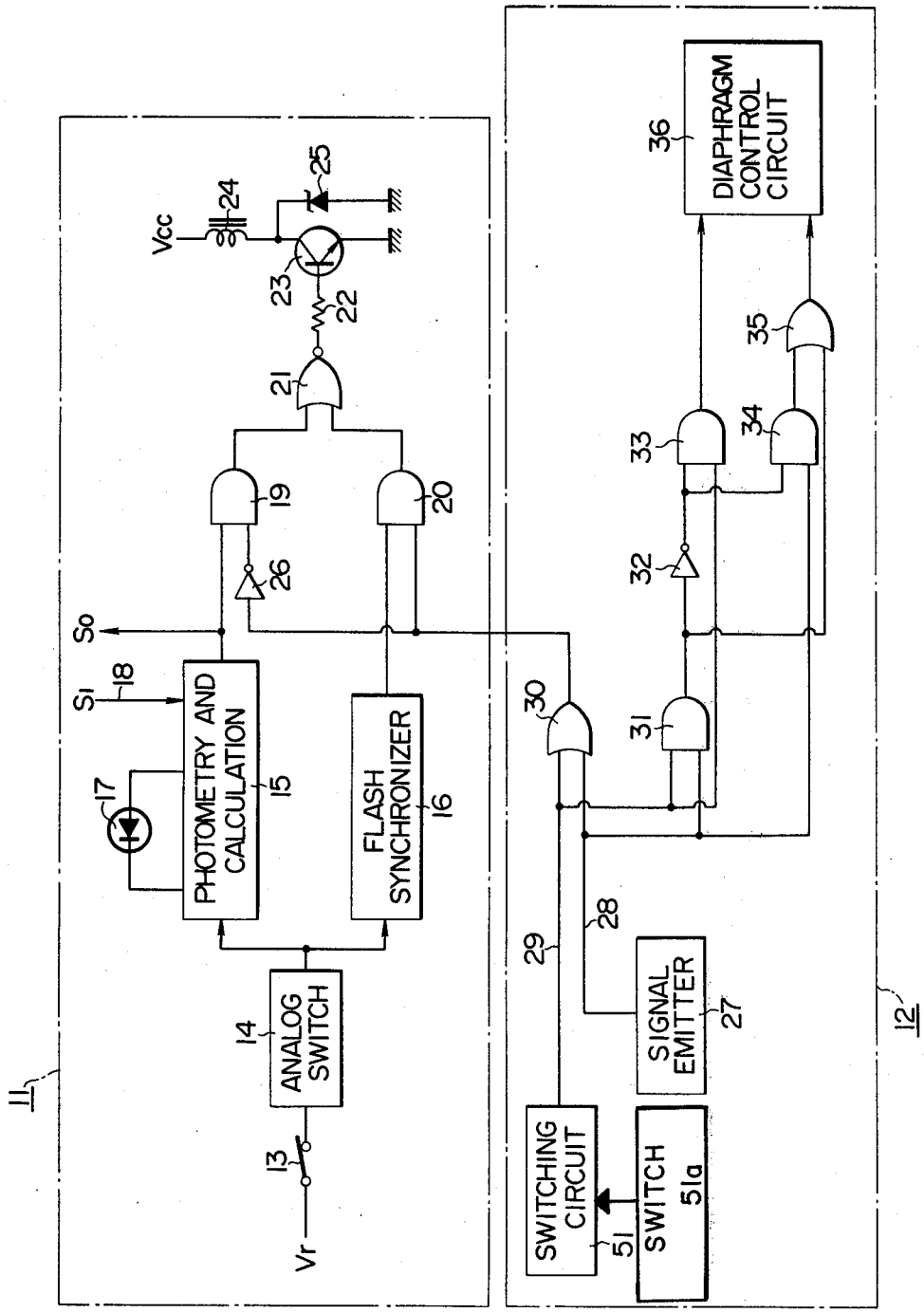
FIG. 1 is a circuit diagram of the electrical circuit of a diaphragm control apparatus for a camera which is constructed according to one embodiment of the invention.

Referring to FIG. 1, the electrical circuit of a diaphragm control apparatus for a camera of the invention includes a shutter speed presetting circuit 11 and a diaphragm presetting circuit 12. The shutter speed presetting circuit 11 comprises a normally closed trigger switch 13 which is opened in response to the depression of a release button of the camera, a semiconductor analog switch 14 connected to one terminal of the trigger switch 13, a reflection photometry and calculation circuit 15 and a flash synchronizing circuit 16 both having their inputs connected to the output of the analog switch 14, a photoelectric transducer element 17 connected across photometric terminals of the photometry and calculation circuit 15 for determining reflected light from the first shutter blind and the film surface of the camera and providing an electrical signal corresponding thereto, AND circuit 19 having one of its inputs connected to the output of the photometry and calculation circuit 15, an inverter 26 having its output connected to the other input of AND circuit 19, another AND circuit 20 having one input connected to the output of the flash synchronizing circuit 16, NOR circuit 21 having its input connected to the outputs of the both AND circuits 19 and 20, a resistor 22 having its one end connected to the output of NOR circuit 21, an NPN transistor 23 having its base connected to the other end of the resistor 22, a shutter controlling electromagnet 24 having its one end connected to the collector of the transistor 23 and its other end fed with a supply voltage Vcc, and a Zener diode 25 having its cathode connected to the collector of the transistor 23 and its anode connected to the ground. As shown, a reference voltage Vr is applied to the other terminal of the trigger switch 13, and a film speed signal $S_1$ is applied to the photometry and calculation circuit 15 through an input line 18. The photometry and calculation circuit 15 is also adapted to deliver an illumination interrupt signal $S_0$ to an automatic electronic flash.

The diaphragm presetting circuit 12 includes a usual electronic flash/normal photographing switching circuit 51 including a switch 51a which is thrown depending on whether the intended photographing operation utilizes a usual electronic flash or represents a normal photographing operation. The switching circuit 51 produces a high level signal corresponding to logical "1" on a signal line 29 whenever the switch is thrown to its usual electronic flash position, and produces a low level signal corresponding to logical "0" on the signal line 29 whenever the switch is thrown to its normal photographing position. The diaphragm presetting circuit 12 also includes a signal emitter 27 which produces a high level signal corresponding to logical "1" on a signal line 28 whenever a devoted electronic flash is mounted on the camera. OR circuit 30 and AND circuit 31 each receive the both signals on the signal lines 28 and 29, an inverter 32 having its input connected to the output of AND circuit 31, another AND circuit 33 having its one input connected to the output of the inverter 32 and having its other input connected to receive an output signal from the switching circuit 51, a further AND circuit 34 having its one input connected to the output of the inverter 32 and having its other input connected to receive an output signal from the signal emitter 27, another OR circuit 35 having its one input connected to the output of AND circuit 34 and having its other input connected to the output of AND circuit 31, and a diaphragm control circuit 36 which is responsive to output signals from AND circuit 33 and OR circuit 35. It is to be noted that the output of OR circuit 30 is also connected to the other input of AND circuit 20 and to the input of the inverter 26 in the shutter speed presetting circuit 11.

Figure 2:
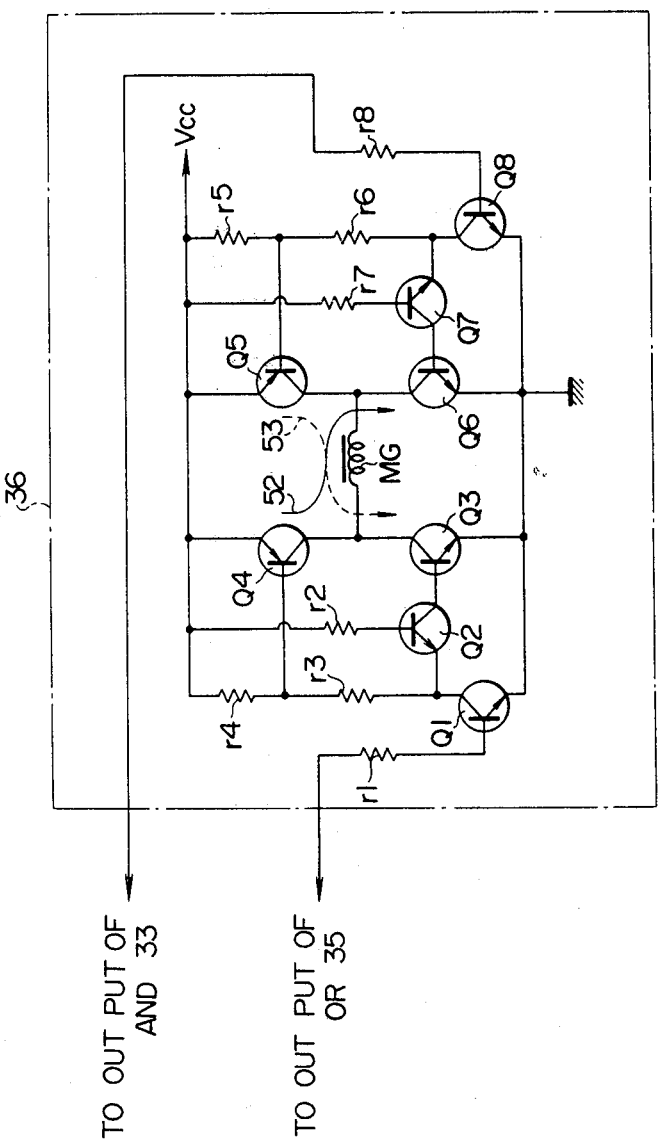
FIG. 2 is a detailed circuit diagram of a diaphragm control circuit which forms part of the electrical circuit shown in FIG. 1.

FIG. 2 shows the detail of the diaphragm control circuit 36. The output of AND circuit 33 and OR circuit 35, both shown in FIG. 1, is connected to the base of transistors Q1, Q8 through resistors r1, r8, respectively. These transistors Q1, Q8 have their collectors connected to the emitter of transistors Q2, Q7, respectively, and also to one end of resistors r3, r6. The transistors Q2, Q7 have their collectors connected to the base of transistors Q3, Q6, respectively, while the base of transistors Q2, Q7 is connected to one end of resistors r2, r7, respectively. The transistors Q3, Q6 have their collectors connected to the collector of transistors Q4, Q5, respectively, which have their base connected to the other end of the resistors r3, r6 and to one end of resistors r4, r5, respectively. The transistors Q1, Q3, Q6 and Q8 have their emitter connected to the ground while the other end of the resistors r2, r4 and r5 as well as the emitter of the transistors Q4, Q5 are connected to a supply bus to which a supply voltage Vcc is applied. A diaphragm controlling electromagnet MG is connected between the collector of transistor Q3 and the collector of transistor Q6.

In operation, it is assumed that a devoted electronic flash is used to take a picture. In this instance, the switch mentioned above is thrown to its normal photographing position, and hence the usual electronic flash/normal photographing switching circuit 51 produces a low level signal on the signal line 29. Since the devoted electronic flash is mounted on the camera, the signal emitter 27 produces a high level signal on the signal line 28. Consequently, AND circuit 31 produces a low level output, which is inverted to a high level by the inverter 32. AND circuit 34 receives the high level signal from the inverter 32 and the high level signal from the signal emitter 27, and hence produces a high level output signal which is applied to OR circuit 35, which hence produces a high level output signal to be applied to the diaphragm control circuit 36. AND circuit 33 produces a low level output signal which is applied to the diaphragm control circuit 36 in response to the low level output signal from the switching circuit 51.

When OR circuit 35 produces the high level output signal and AND circuit 33 produces the low level output signal, both of which are applied to the diaphragm control circuit 36, these signals are applied to the base of transistors Q1, Q8 through the resistors r1, r8, as shown in FIG. 2, whereby the transistor Q1 is turned on while the transistor Q8 is turned off. When transistor Q1 is turned on, transistors Q2, Q4 are also turned on while transistor Q3 is turned off. When transistor Q8 is turned off, transistor Q5 is turned off while transistor Q6 is turned on by a base current which passes through the base-collector of transistor Q7. Accordingly, a current flows through the diaphragm controlling electromagnet MG as indicated by a solid line arrow 52 to energize it.

When the current flow indicated by the arrow 52 passes through the electromagnet MG, a proper diaphragm value of F8, for example, corresponding to the devoted electronic flash is established in the camera by a diaphragm control mechanism 43, to be described later in connection with FIG. 3.

On the other hand, OR circuit 30 shown in FIG. 1 produces a high level output signal in response to the output signal from the signal emitter 27, thus feeding the inverter 26 and the other input of AND circuit 20. Consequently, the inverter 26 produces a low level output, disabling AND circuit 19. When the shutter of the camera is released under this condition, the trigger switch 13 is opened to trigger the following analog switch 14. This activates the reflection photometry and calculation circuit 15 and the flash synchronizing circuit 16. The calculation circuit 15 is supplied with the film speed information S1 which is fed through the input line 18 and is ready to determine a proper exposure period in consideration of such information while determining the reflected light with the photoelectric transducer element 17. Its output signal is fed to one input of AND circuit 19, which however is disabled by the output from the inverter 26.

The flash synchronizing circuit 16 produces a flash synchronizing shutter speed signal which corresponds to a flash synchronizing shutter speed of 1/60 second, for example. This signal is applied through AND circuit 20 and NOR circuit 21 to transistor 23 in order to control the second shutter blind controlling electromagnet 24 so that the given shutter speed is achieved.

Thus, in the electrical circuit shown in FIG. 1, the diaphragm presetting circuit 12 controls the diaphragm control circuit 36 so that a proper diaphragm value associated with the devoted electronic flash is established in the camera. When the release button of the camera is depressed under this condition, the shutter speed presetting circuit 11 operates in response thereto, controlling the second shutter blind controlling electromagnet 24, establishing a shutter speed of 1/60 second, for example. When the shutter of the camera is fully open as a result of synchronization with the flash synchronizing shutter speed, the electronic flash is activated to emit light. Reflected light from an object being photographed which is irradiated with the flashlight is determined by the photometry and calculation circuit 15 shown in FIG. 1. When the amount of light received, or the exposure of the film, reaches a proper value, it produces an output signal in the form of a flash illumination interrupt signal, which is transmitted to the electronic flash to terminate the emission of light therefrom.

When a picture is taken utilizing a usual electronic flash, a diaphragm ring of the camera is manually operated to establish a diaphragm value which is suitable for use with the usual electronic flash. The changeover switch mentioned above is thrown to its usual flash position. Thus, the switching circuit 51 produces a high level signal on the signal line 29. Since the devoted electronic flash is not mounted on the camera, the signal emitter 27 produces a low level signal on the signal line 28. Consequently, the output of AND circuit 31 is low while the output of inverter 32 is high, and hence the output of AND circuit 33 is high. The output of AND circuit 34 is low as is the output of OR circuit 35.

The high level output signal from AND circuit 33 and the low level output signal from OR circuit 35 are applied to the diaphragm control circuit 36. Now, transistor Q1 shown in FIG. 2 is turned off while transistor Q8 is turned on. As transistor Q8 is turned on, transistors Q5, Q7 are turned on, while transistor Q6 is turned off. When transistor Q1 is turned off, transistor Q4 is turned off while transistor Q3 is turned on by a base current which passes through the base-collector path of transistor Q2. Hence, a current flows from transistor Q5 through the electromagnet MG to transistor Q3 in a direction indicated by a phantom line arrow 53, thus energizing it.

When the current flow through the electromagnet MG is in a direction indicated by the arrow 53, the diaphragm control mechanism 43 shown in FIG. 3 operates a diaphragm lever 9 to its minimum diaphragm position. Consequently, when a diaphragm assembly 3 shown in FIG. 3 is operated in response to a shutter release operation, the diaphragm of the camera can be controlled to its minimum value. However, during a photographing mode which utilizes the usual electronic flash, the diaphragm ring of the camera is manually operated to establish a given diaphragm value which is suitable for use with usual electronic flash as mentioned previously, so that when the diaphragm assembly 3 is operated in response to the shutter release operation, the diaphragm of the camera is controlled to a diaphragm value which is established by the diaphragm ring.

In response to the high level output signal from the switching circuit 51, OR circuit 30 of FIG. 1 produces a high level output signal in the same manner as when the devoted electronic flash is used, with the output signal being applied to the shutter speed presetting circuit 11. When the shutter of the camera is released under this condition, the shutter speed presetting circuit 11 operates in the same manner as before to control the electromagnet 24 to establish a shutter speed for the camera which corresponds to the flash synchronizing shutter speed.

In this manner, when a flash photography takes place utilizing a usual electronic flash, the picture is taken with a diaphragm value which is manually established by means of the diaphragm ring so as to be appropriate for the usual electronic flash. The shutter speed which is used in this instance is the same flash synchronizing shutter speed as that used during the use of the devoted electronic flash.

In the description given thus far, it has been assumed that the changeover switch in the switching circuit 51 has been properly thrown in a manner corresponding to the usual electronic flash or the devoted electronic flash photographing mode. However, it is possible that the changeover switch may be left in its usual electronic flash position even though the devoted electronic flash is mounted on the camera. A flash photographing operation in this instance will now be described. As will be evident, the high level signals are present on both signal lines 28 and 29. Consequently, AND circuit 31 produces a high level output, which is inverted to a low level output by the inverter 32. Consequently, AND circuit 33 produces a low level output. AND circuit 34 produces a low level output while OR circuit 35 produces a high level output. The output of AND circuit 33 is low while the output of OR circuit 35 is high, which condition is the same as when taking a picture utilizing the devoted electronic flash, and the changeover switch is in the normal position. This means that whenever the devoted electronic flash is used, a diaphragm value which is appropriate for use with the devoted electronic flash is automatically established in the camera for flash photography if the changeover switch is thrown to either usual electronic flash position or normal photographing position. It will be understood that the shutter speed which prevails in this instance is the same flash synchronizing shutter speed as described above.

The diaphragm controlling electromagnet MG is disposed in a diaphragm control mechanism 43 as shown in FIG. 3. The diaphragm controlling electromagnet MG which is controlled by the diaphragm control circuit 36 through lead wires 54, 55 is disposed on a left-hand top portion of a substrate 114 of the diaphragm control mechanism 43. As shown in FIG. 2, a current is passed through the electromagnet MG in the direction of either the solid line arrow 52 or the phantom line arrow 53. When the electromagnet MG is energized by such current flow, a cam plate 117 is operated to control the diaphragm lever 9 which is utilized to establish a diaphragm aperture of the camera.

Referring to FIGS. 3 to 5, the diaphragm control mechanism 43 will be described in detail. The diaphragm control mechanism 43 shown in FIG. 3 is applied to a single lens reflex camera. As is well known, a single lens reflex camera includes a movable reflecting mirror 2 disposed below a pentaprism 1, and when the mirror 2 is driven upward when it is desired to take a picture, light passing through a taking lens impinges on a film located rearwardly of the mirror through a focal plane shutter. An interchangeable taking lens barrel, not shown, is disposed forwardly of the mirror 2, and receives the diaphragm assembly 3 and a taking lens, not shown therein. The diaphragm assembly 3 includes a diaphragm frame 4, diaphragm blades 5 (only one being shown) and a diaphragm ring 7 which is biased in one direction by a return spring 6. The diaphragm ring 7 is integrally formed with an arm 7a which is engageable by an extension of the diaphragm lever 9 which is contained in the diaphragm control mechanism 43 provided on the part of the camera body.

A cam plate 117 is rotatably mounted on the substrate 114 by means of a pin 118, and includes a pair of permanent magnets 116 integrally secured to one end thereof at spaced points so as to be located opposite to the both poles of the electromagnet MG, and a two step cam 117a (see FIGS. 4 and 5) formed on its other end. A detent piece 9a on the free end of the diaphragm lever 9 is located opposite to the cam 117a of the cam plate 117. The cam plate 117 is angularly movable in two steps depending on the relationship between the electromagnet MG and the permanent magnets 116 which is governed by the energized condition of the electromagnet MG. These two angular positions correspond to a diaphragm aperture associated with the devoted electronic flash and another diaphragm aperture associated with usual electronic flash. Consequently, during a flash photography, the operation of the diaphragm control mechanism 43 determines the angular movement of the diaphragm lever 9, thus determining a diaphragm aperture.

When a shutter release button, not shown, is depressed, a release lever 120 has its lower end driven in a direction indicated by an arrow, thus turning clockwise against the resilience of a spring 121. As a result, a drive lever 122 which has been engaged therewith is released. The drive lever 122 turns clockwise about its pivot pin 125 under the resilience of a coiled tension spring 124 which extends between the drive lever and a charging lever 123 until it bears against a pin, not shown, fixedly mounted on the charged lever 123, whereupon its turning movement is interrupted. The angular motion of the drive lever 122 permits a mirror lever 126, which has been inhibited from rotating as a result of an abutment of a detent pin, not shown, against the drive lever, to turn counter-clockwise about its pivot pin 128 under the resilience of a coiled tension spring 127 which extends between the lever 126 and the charging lever 123, thus causing the mirror 2 to angularly move upwardly, through a drive pin 2a associated therewith which extends through an elongate slot formed in the free end of the mirror lever 126. The angular motion of the drive lever 122 also allows the diaphragm lever 9, which has been prevented from rotating as a result of its abutment against a detent pin 122a on the lever 122, to rotate clockwise about its pivot pin 125 under the resilience of a coiled tension spring 129 which extends between one end of the diaphragm lever 9 and the substrate 114 until the detent piece 9a bears against the cam 117a of the cam plate 117, whereupon it ceases to rotate. The detent piece 9a on the diaphragm lever 9 bears against either step of the cam 117a in accordance with the angle through which the cam plate 117 rotates, thus determining the angle of rotation of the diaphragm lever 9 and hence a diaphragm aperture established by the diaphragm assembly 3.

More specifically, when the devoted electronic flash is mounted on the camera and a current is passed through the diaphragm controlling electromagnet MG in the direction indicated by the solid line arrow 52 (see FIG. 2), (a corresponding current flow through the electromagnet MG being shown in FIG. 4 by an arrow), the both poles of the electromagnet MG will be as shown, so that the cam plate 117 rotates clockwise under the tension of the spring 119 to bring the detent piece 9a into abutment against the left-hand step of the cam 117a whenever the diaphragm lever 9 rotates clockwise, thus establishing a diaphragm aperture associated with the devoted electronic flash. When the usual electronic flash is mounted on the camera and the current flow through the electromagnet MG is as indicated by the phantom line arrow 53 (FIG. 2), the current flow through the coil of the electromagnet MG will be as shown by an arrow in FIG. 5, which is opposite from the direction shown in FIG. 4, and the polarity of the poles of the electromagnet MG is reversed. Consequently, the cam plate 117 rotates counterclockwise against the resilience of the spring 119 to displace the right-hand step of the cam 110a further spaced from the detent piece 9a on the diaphragm lever 9. Hence, when the diaphragm lever 9 rotates clockwise in response to a shutter release operation, the detent piece 9a is capable of angularly moving through an increased angle until it bears against the right-hand step of the cam 117a. The fact that the diaphragm lever 9 can be rotated through an increased angle means that the diaphragm aperture can be reduced to its minimum value. In practice, the diaphragm assembly operates to establish a manually preset diaphragm value. Hence, the diaphragm value which is used when the usual electronic flash is employed corresponds to a manually preset value.

As discussed above, in the diaphragm control apparatus of the invention, a signal indicative of the fact that the devoted electronic flash is mounted on the camera predominates over a signal from the changeover switch, so that a diaphragm value associated with the devoted electronic flash is automatically established in the camera. Thus when the devoted electronic flash is used, it is unnecessary to operate the diaphragm assembly of the camera or to operate changeover switch, and yet a proper diaphragm value is established.

What is claimed is:

1. A diaphragm control apparatus for combined use of an electronic flash with a camera with which a devoted electronic flash and a usual electronic flash can be selectively used, the apparatus including switch means which is operated in accordance with a flash photography utilizing a usual electronic flash, a flash photography utilizing a devoted electronic flash or a normal photography, a usual electronic flash/normal photographing switching circuit which produces a first output signal indicative of the use of a usual electronic flash whenever the changeover switch is thrown to a position corresponding to the use of a usual electronic flash, and a signal emitter for producing a second output signal indicative of a devoted electronic flash being mounted on the camera; the apparatus further comprising a diaphragm presetting circuit for receiving the first and the second output signal from the switching circuit and the signal emitter and for producing a first diaphragm control signal for taking a picture utilizing a usual electronic flash whenever the switching circuit has produced the first output signal and the signal emitter has not produced the second output signal and for producing a second diaphragm control signal for taking a picture utilizing a devoted electronic flash whenever the switching circuit has not produced the first output signal and the signal emitter has produced the second output signal, the diaphragm presetting circuit predominantly producing the second diaphragm control signal whenever the switching circuit has produced the first output signal and the signal emitter has produced the second output signal, and a diaphragm control mechanism responsive to either diaphragm control signal from the diaphragm presetting circuit to establish a diaphragm aperture corresponding to either diaphragm control signal.

2. A diaphragm control apparatus according to claim 1 in which the diaphragm presetting circuit comprises a logic circuit which effects a logic operation on the first and second output signals from the switching circuit and the signal emitter, respectively, and a diaphragm controlling circuit responsive to an output signal from the logic circuit for controlling a diaphragm controlling electromagnet.

3. A diaphragm control apparatus according to claim 2 in which the diaphragm controlling circuit includes a transistor circuit which is responsive to a signal from the logic circuit which corresponds to the output signal from either the switching circuit or the signal emitter for energizing the diaphragm controlling electromagnet in a first or second direction which are opposite from each other.

4. A camera including a diaphragm control apparatus, said camera being usable with a usual electronic flash or with a devoted electronic flash, said apparatus comprising:
- switch means having a first position for a normal photographing operation or a devoted electronic flash operation, and a second position for a usual electronic flash operation;
- a switching circuit for producing a first output signal indicative of a usual electronic flash being mounted on said camera and said switch means being in said second position;
- a signal emitter for producing a second output signal indicative of a devoted electronic flash being mounted on said camera and said switch means being in either said first position or said second position;
- a diaphragm presetting circuit responsive to receiving said first output signal only for producing a first diaphragm control signal and responsive to receiving said second output signal only for producing a second diaphragm control signal and responsive to receiving both said first and second output signals for producing said second diaphragm control signal; and
- a diaphragm control mechanism responsive to said first or second diaphragm control signals from the diaphragm presetting circuit for establishing a diaphragm aperture corresponding to said first or second diaphragm control signals.

* * * * *